United States Patent
Krysinsky

[11] Patent Number: 5,816,533
[45] Date of Patent: Oct. 6, 1998

[54] METHOD AND DEVICE FOR REDUCING THE VIBRATION GENERATED ON THE STRUCTURE OF A HELICOPTER

[75] Inventor: Tomasz Krysinsky, Marseille, France

[73] Assignee: Eurocopter, Marignane Cedex, France

[21] Appl. No.: 683,383

[22] Filed: Jul. 18, 1996

[30] Foreign Application Priority Data

Jul. 27, 1995 [FR] France .................................. 95 09144

[51] Int. Cl.⁶ .................................................. B64C 27/54
[52] U.S. Cl. ........................ 244/17.13; 416/31; 416/500; 701/3
[58] Field of Search .................................. 244/194, 195, 244/191, 17.13, 17.27, 76 R; 701/3; 416/31, 36, 61, 168 R, 500

[56] References Cited

U.S. PATENT DOCUMENTS

| 4,965,879 | 10/1990 | Fischer, Jr. .............................. | 244/17.13 |
| 5,072,893 | 12/1991 | Charkravarty et al. ................ | 244/76 R |
| 5,108,044 | 4/1992 | Weiner .................................. | 244/17.19 |
| 5,195,700 | 3/1993 | Fogler, Jr. et al. ..................... | 244/76 R |
| 5,242,130 | 9/1993 | Mouille et al. ........................ | 244/17.13 |
| 5,511,944 | 4/1996 | Ide et al. ............................... | 244/17.13 |

FOREIGN PATENT DOCUMENTS

| 0501659A1 | 9/1992 | European Pat. Off. . |
| 0521759A1 | 1/1993 | European Pat. Off. . |
| 2149473 | 6/1985 | United Kingdom . |
| 8901896A1 | 3/1989 | WIPO . |

*Primary Examiner*—Galen L. Barefoot
*Attorney, Agent, or Firm*—Stevens, Davis, Miller & Mosher, L.L.P.

[57] ABSTRACT

The present invention relates to a method and a device for reducing the vibration generated on the structure (14) of a helicopter (2) by the aerodynamic flow through the main rotor (3).

According to the invention, said device (1) includes:
- at least one sensor (16, 17, 18) measuring the vibration generated on said structure (14); and
- a calculating means (19) determining, from said measurements, an alternating variation in pitch of the blades (6) of the tail rotor (5) of the helicopter (2), capable of generating an alternating force ($\vec{T}1$) opposing said vibration, and transmitting the pitch variation thus determined to a blade (6) pitch control system (7).

25 Claims, 3 Drawing Sheets

METHOD AND DEVICE FOR REDUCING THE VIBRATION GENERATED ON THE STRUCTURE OF A HELICOPTER

FIELD OF THE INVENTION

The present invention relates to a method and a device for reducing the vibration generated on the structure of a helicopter by the aerodynamic flow through the main lift and forward drive rotor of said helicopter.

DESCRIPTION OF RELATED ART

It is known that the main rotor, in turning, sucks in air situated above it and drives it downwards, accelerating it, in such a way as to create a stream of air in motion. The pressure and the speed of the air vary all along this airstream. The flow of this air over the structure of the helicopter generates vibration, particularly lateral vibration, which is particularly noticeable in the cockpit region and is generally called "tail shake" in aeronautical technology.

The vibration thus generated is due principally to excitation by the abovementioned aerodynamic flow of the characteristic modes of the structure of the helicopter, and particularly of the first lateral bending mode of the tail of the helicopter. The vibration due to excitation of this first lateral bending mode generally exhibits a frequency of a few hertz and is a major nuisance.

The range of vibration thus generated exhibits many drawbacks, particularly:

- in terms of the comfort of the crew and of the passengers,
- in terms of the fatigue of the components and equipment items, as well as
- in terms of the operation of weapon systems when the helicopter is equipped therewith.

SUMMARY OF THE INVENTION

The object of the present invention is to remedy these drawbacks. It relates to a method making it possible, simply and effectively, to reduce the vibration generated on the structure of a helicopter by the aerodynamic flow through the main lift and forward drive rotor of said helicopter, said helicopter including a tail rotor intended to combat the torque of said main rotor.

To this end, said method is noteworthy according to the invention in that:

a) the vibrations generated are measured at at least one site on the structure of said helicopter;

b) from said measurements, an alternating variation in pitch of the blades of the tail rotor is determined, capable of generating an alternating force opposing said vibrations; and c) the alternating pitch variation thus determined is applied to a tail rotor blade pitch control system.

Hence, by virtue of the generation of said opposing alternating force, it is possible simply and effectively to reduce said vibration, with its previously mentioned drawbacks.

It will be noted, moreover, that the frequency of said vibration and thus also of said opposing alternating force (generally about 5 to 6 Hz) is much higher than the frequency of operating said tail rotor by the pilot (generally less than 1 Hz), for yaw control, so that the implementation of the method according to the invention generates no incidence on the yaw control.

In order not to drive the tail rotor continuously, and to take account only of the most important and the most detrimental vibration (the frequency of which is generally less than 15 Hz), advantageously, the measured vibration is filtered in terms of frequency and account is taken, at stage b), of the method according to the invention, only of said filtered vibration.

Moreover, for reasons of stability and of safety, the amplitude of the opposing alternating force is limited advantageously to a predefined value.

Moreover, for reasons of maneuverability, as well as in order to detect any out-of-balance deterioration in the helicopter, implementation of the method in accordance with the invention for vibration reduction can be dispensed with when said helicopter is on the ground.

Likewise, said implementation can be dispensed with when the helicopter is subjected to particular flight conditions.

It is known, moreover, that the plane of the tail rotor of a helicopter may be either parallel or inclined with respect to the median vertical longitudinal plane of said helicopter.

When the method in accordance with the invention is applied to a helicopter in which the plane of the tail rotor is parallel to the median vertical longitudinal plane of the helicopter, advantageously:

- at stage a), the lateral vibration generated is measured at at least one site of the structure of said helicopter; and
- at stage b), a lateral alternating force is generated opposing said lateral vibration.

Moreover, in this case, in order to reduce any additional vertical vibration, a vertical alternating force opposing said vertical vibration is generated, using an auxiliary means, preferably one or more aerodynamic surfaces with controllable inclination.

When the plane of the tail rotor of the helicopter is inclined with respect to the median vertical longitudinal plane of said helicopter, advantageously:

- at stage a), the lateral vibration and the vertical vibration generated are measured at at least one site of the structure of said helicopter; and
- at stage b), an opposing alternating force is generated, exhibiting a lateral component and a vertical component respectively opposing said lateral vibration and said vertical vibration.

The present invention also relates to a device for reducing the vibration generated on the structure of a helicopter by the aerodynamic flow through the main lift and forward drive rotor of said helicopter, said helicopter including an anti-torque tail rotor the pitch of the blades of which is controlled by a control system.

According to the invention, said device is noteworthy in that it includes:

- at least one sensor capable of measuring the vibration generated on the structure of said helicopter; and
- a calculating means capable:
  - of determining, from said measurements, an alternating variation in pitch of the blades of the tail rotor, capable of generating an alternating force opposing said vibration; and
  - of transmitting the pitch variation thus determined to said blade pitch control system.

Said sensor may particularly be an accelerometer, a rate gyro or a strain gauge.

In one particular embodiment, said device advantageously includes an auxiliary means controlled by said calculating means and capable of generating a vertical alternating force opposing vertical vibrations.

BRIEF DESCRIPTION OF THE DRAWINGS

The figures of the attached drawing will give a good understanding of how the invention can be produced. In these figures, identical references designate similar elements.

DETAILED DESCRIPTION OF THE PREFERRED EMBODIMENT

Figure 1:
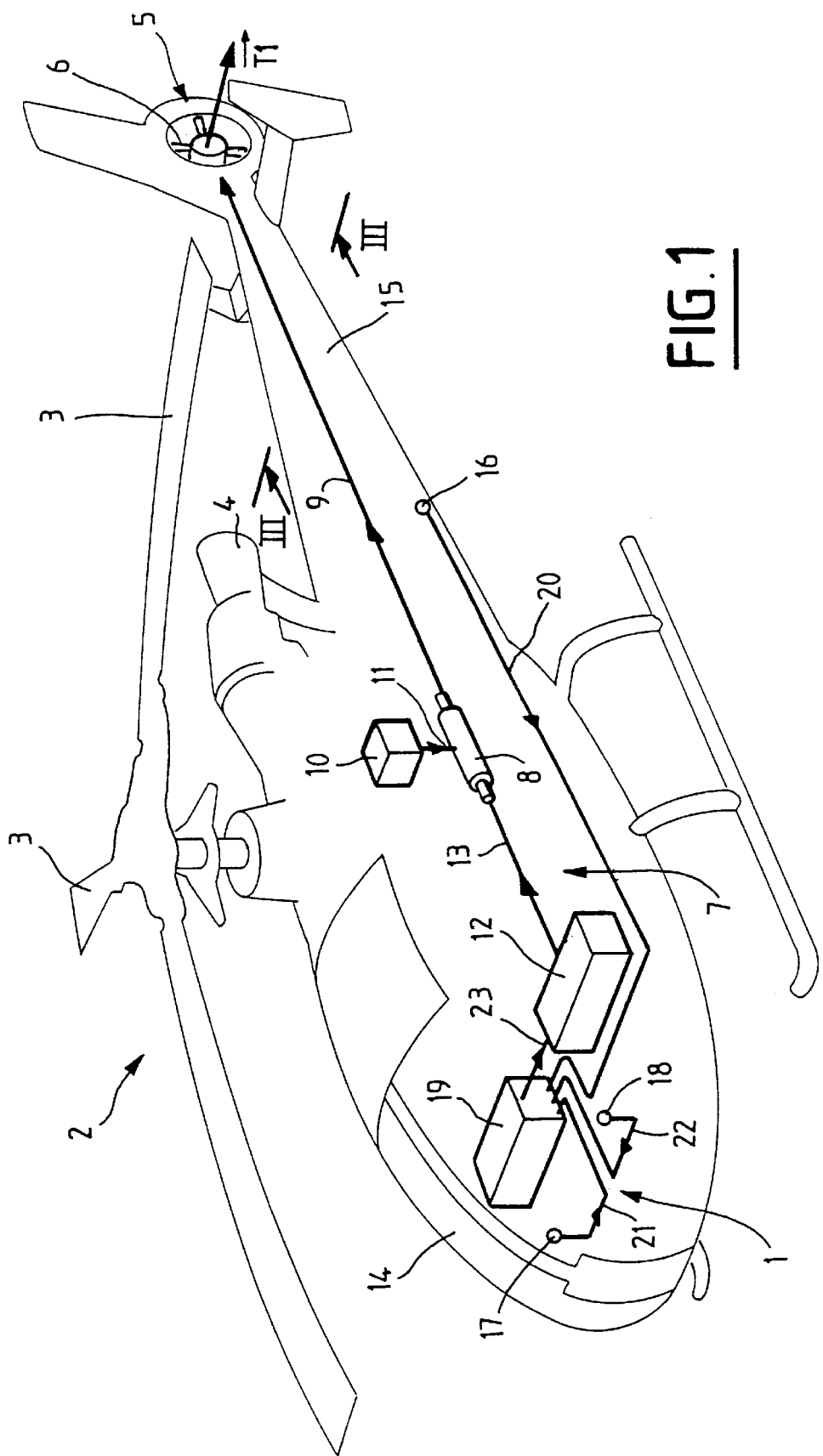
FIG. 1 diagrammatically shows a device in accordance with the invention mounted on a helicopter.

The device 1 in accordance with the invention and represented diagrammatically in FIG. 1 is intended to reduce the vibration known by the name of "tail shake" in aeronautical technology, which is generated on the structure of a helicopter 2, as detailed below.

As can be seen in FIG. 1, said helicopter 2 includes:

a main rotor 3 for lift and forward drive driven by means of motive power supplied by an engine 4; and a tail rotor 5 intended to combat the torque of said main rotor 3.

Said tail rotor 5, which is also used for yaw guidance of the helicopter 2, is equipped in a known way with blades 6, the pitch of which can be controlled by means of a control system 7 which includes:

an actuating jack 8 or the like (linked by a link 9 represented diagrammatically to said tail rotor 5) supplied with energy by an energy source 10 via a link 11; and a control device 12 which supplies the control commands to said actuating jack 8 via a link 13.

Figure 2:
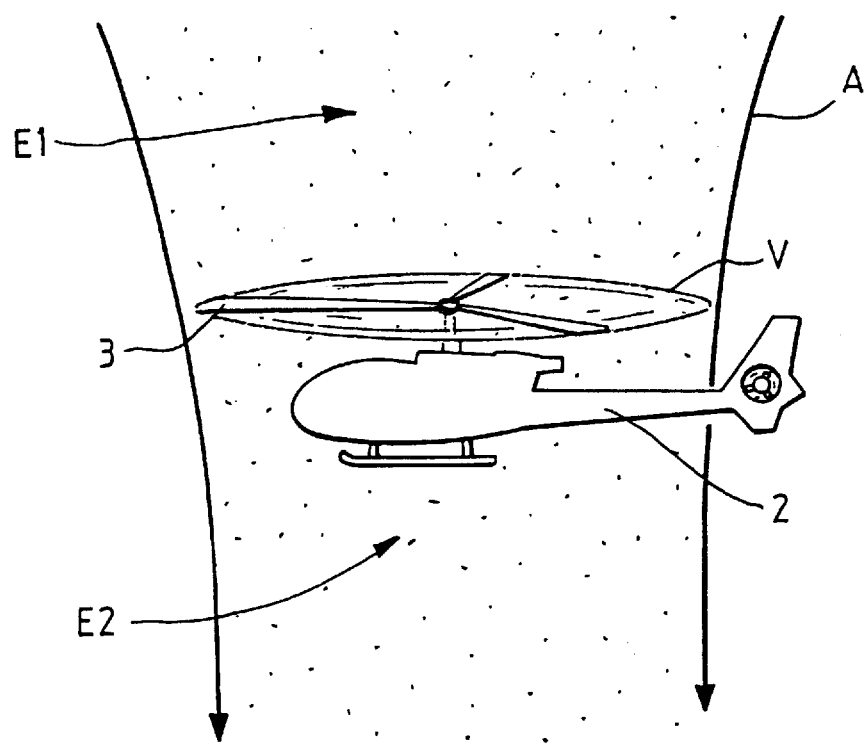
FIG. 2 diagrammatically illustrates the airstream formed by the rotation of the main rotor of a helicopter, which is a generator of vibration.

It is known that, to lift the helicopter 2 and drive it forward, the main rotor 3 draws air from the space E1 situated above it and drives it towards the space E2 situated below, accelerating it. It thus creates a stream of air A in movement, of variable speed and pressure, the diameter of which at the level of the helicopter 2 is substantially equal to the diameter of the wings V, as represented in FIG. 2. In contact with the helicopter 2, this aerodynamic flow causes vibration on the structure 14 of said helicopter 2.

This vibration, mainly but not exclusively lateral, is due principally to excitation by the aerodynamic flow of the characteristic modes of the structure 14 of the helicopter 2 and particularly of the first lateral bending mode of the tail 15 of the helicopter 2.

The vibration due to this first lateral bending mode generally exhibits a frequency of a few hertz and is a particular nuisance.

The range of vibration thus generated particularly exhibits drawbacks in terms of:

the comfort of the crew and of the passengers, fatigue of components and of equipment items, and the operation of weapon systems, not represented, when the helicopter 2 is equipped therewith.

The device 1 in accordance with the invention is intended to reduce said vibration in order to remedy these drawbacks.

To this end, said device 1 includes:

sensors 16, 17, 18 of known type, for example accelerometers, rate gyros or strain gauges, represented diagrammatically in FIG. 1, mounted at various sites on the structure 14 of the helicopter 2 and capable of measuring the vibration generated at these sites on said structure 14; and a calculating means 19 linked by means of links 20, 21, 22 respectively to said sensors 16, 17, 18 and capable:

of determining, from said vibration measurements, an alternating variation in pitch of the blades 6 of the tail rotor 5, capable of generating an alternating force $\vec{T}1$, opposing said vibration; and of transmitting the pitch variation thus determined to the control device 12 of said blade 6 pitch control system 7, via a link 23.

Thus, the existing vibration is reduced by the opposing action of this alternating force $\vec{T}1$ generated by control of the pitch of the blades 6.

As the frequency of said opposing alternating force $\vec{T}1$ is equal to the frequency of the vibration in question, namely 5 to 6 Hz, the operation of the device 1 in accordance with the invention generates no incidence on the yaw control of the helicopter 2, said control being in fact driven at much lower frequencies, generally below 1 Hz.

Moreover, the device 1 in accordance with the invention makes it possible to limit the resonance of one or more modes of the structure, which are situated in proximity to a harmonic of the rotational frequency of the main rotor, for which the deformation of the tail boom of the helicopter 2 is significant.

Figure 3:
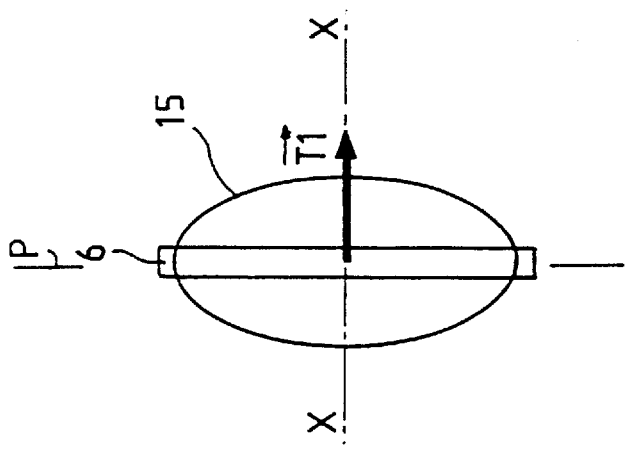
FIG. 3 illustrates a force opposing the vibration, generated on a helicopter the plane of the tail rotor of which is parallel to the median vertical longitudinal plane of said helicopter, on the basis of a diagrammatic cross section along the line III—III of FIG. 1.

As can be seen more precisely in FIG. 3, when the plane of the tail rotor 5, indicated by the blades 6, is parallel to the median vertical longitudinal plane P of the helicopter, said opposing alternating force $\vec{T}1$, generated along the axis X—X of the tail rotor 5, is lateral and is therefore able to oppose the lateral vibration, which is essential in the physical phenomenon in question ("tail shake"), as previously indicated.

In this case, when, in addition to said lateral vibration, the helicopter 2 is subjected to vertical vibration, it is possible, according to the invention, using an auxiliary means, for example one or more aerodynamic surfaces with controllable inclination, not represented and controlled by said calculating means 19, to generate a vertical alternating force, not represented, opposing said vertical vibration.

Figure 4:
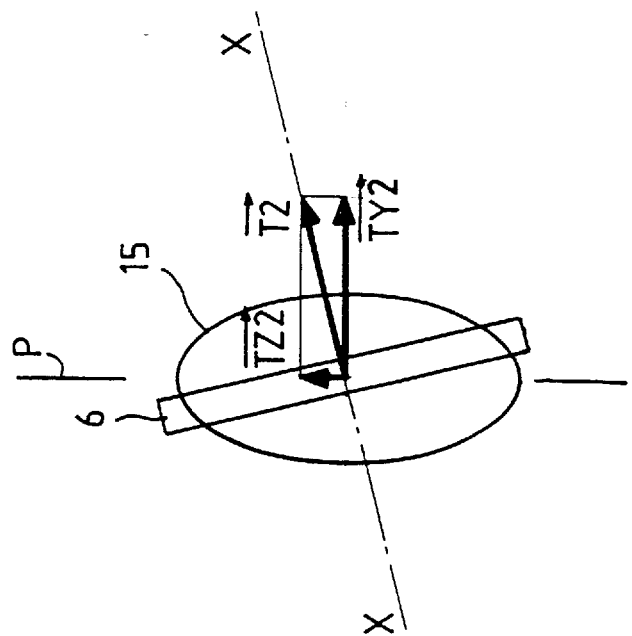
FIG. 4 illustrates a force opposing the vibration generated on a helicopter the plane of the tail rotor of which is inclined with respect to the median vertical longitudinal plane of said helicopter.

Clearly, the present invention applies equally to a helicopter the plane of the tail rotor 5 of which is inclined with respect to the median vertical longitudinal plane P of the helicopter, as represented in FIG. 4.

The application of the device 1 in accordance with the invention to such a helicopter is particularly advantageous, since it makes it possible simultaneously to reduce the lateral vibration and the vertical vibration.

To this end, according to the invention, an alternating variation in the pitch of the blades 6 is determined, making it possible to generate an alternating force $\vec{T}2$, having a lateral component $\vec{TY}2$ and a vertical component $\vec{TZ}2$ such that:

said lateral component $\vec{TY}2$ of the force $\vec{T}2$ effectively opposes said lateral vibration; and said vertical component $\vec{TZ}2$ of the force $\vec{T}2$ effectively opposes said vertical vibration.

This latter embodiment therefore does not require the use of any auxiliary means to reduce the vertical vibration.

Moreover, said calculating means 19 may incorporate a filtering means intended to filter the measured vibration in frequency, in order to adopt only that which is below a defined frequency, for example 15 Hz. This embodiment particularly avoids driving the tail rotor practically continuously, by not taking account of certain negligible vibrations.

Said calculating means 19 may moreover be linked, in a particularly advantageous embodiment, to a means, not represented, which indicates to it when the helicopter 2 is on the ground, so that said calculating means 19 then transmits no control command to the control device 12, as long as said helicopter 2 remains on the ground. The device 1 in accordance with the invention is therefore made inactive on the ground, which particularly makes it possible to detect any out-of-balance deterioration in the helicopter, such detection being impossible when the device 1 is operating.

Moreover, in another particular embodiment, not represented, it is also possible to provide for the device 1 in accordance with the invention to be made inactive in flight, when particular flight conditions appear.

I claim:

1. A method for reducing a vibration generated on a structure of a helicopter by an aerodynamic flow through a main lift and forward drive rotor of said helicopter, said helicopter including an anti-torque tail rotor with blades and a tail rotor blade pitch control system for controlling a pitch of the blades, said method comprising:

(a) measuring the vibration at at least one site on the structure of said helicopter;

(b) determining, in accordance with said vibration measured in step (a), an alternating variation in the pitch of the blades of the tail rotor for generating an alternating force opposing said vibration; and (c) applying the alternating variation in the pitch determined in step (b) to the tail rotor blade pitch control system to control the pitch of the blades.

2. The method as claimed in claim 1, wherein:

step (a) comprises filtering the vibration in frequency to determine a filtered vibration; and step (b) comprises determining the alternating force in accordance only with said filtered vibration.

3. The method as claimed in claim 1, wherein step (b) comprises limiting an amplitude of said alternating opposition force to a predefined value.

4. The method as claimed in claim 1, further comprising:

determining whether the helicopter is on ground; and performing step (c) only when said helicopter is not on the ground.

5. The method as claimed in claim 1, further comprising:

determining whether a particular flight condition is present; and performing step (c) only when said particular flight condition is not present.

6. The method as claimed in claim 1, wherein, when a plane of the tail rotor is parallel to a median vertical longitudinal plane of the helicopter:

the vibration measured in step (a) comprises a lateral vibration; and the alternating force in step (b) comprises a lateral alternating force.

7. The method as claimed in claim 6, further comprising, in order to reduce an additional vertical vibration, generating a vertical alternating force opposing said vertical vibration, using an auxiliary means.

8. The method as claimed in claim 2, wherein the filtered vibration includes only components of the vibration having frequencies below a predetermined frequency.

9. The method as claimed in claim 1, wherein, when a plane of the tail rotor is inclined with respect to a median vertical longitudinal plane:

the vibration measured in step (a) comprises a lateral vibration and a vertical vibration; and the alternating force in step (b) comprises a lateral component and a vertical component respectively opposing said lateral vibration and said vertical vibration.

10. The method as claimed in claim 8, wherein the predetermined frequency is 15 Hz.

11. The method as claimed in claim 1, wherein the alternating force has a frequency higher than a yaw control frequency at which the tail rotor is operated for yaw control.

12. The method as claimed in claim 11, wherein the yaw control frequency is less than one Hz.

13. The method as claimed in claim 11, wherein the frequency of the alternating force is less than 15 Hz.

14. The method as claimed in claim 13, wherein the frequency of the alternating force is 5–6 Hz.

15. A device for reducing a vibration generated on a structure of a helicopter by an aerodynamic flow through a main lift and forward drive rotor of said helicopter, said helicopter including an anti-torque tail rotor with blades and a blade pitch control system for controlling a pitch of the blades, said device comprising:

at least one sensor for measuring the vibration generated on the structure of said helicopter; and a calculating means for:

determining, from said vibration measured by said at least one sensor, an alternating variation in the pitch of the blades of the tail rotor for generating an alternating force opposing said vibration; and transmitting the alternating variation to said blade pitch control system to control the pitch of the blades.

16. The device as claimed in claim 15, wherein said at least one sensor comprises an accelerometer.

17. The device as claimed in claim 15, wherein said at least one sensor comprises a rate gyro.

18. The device as claimed in claim 15, wherein said at least one sensor comprises a strain gauge.

19. The device as claimed in claim 15, further comprising an auxiliary means, controlled by said calculating means, for generating a vertical alternating force opposing a vertical component of said vibration.

20. The device as claimed in claim 15, wherein the calculating means filters the vibration to determine a filtered vibration which includes only components of the vibration having frequencies below a predetermined frequency.

21. The device as claimed in claim 20, wherein the predetermined frequency is 15 Hz.

22. The device as claimed in claim 15, wherein the alternating force has a frequency higher than a yaw control frequency at which the tail rotor is operated for yaw control.

23. The device as claimed in claim 22, wherein the yaw control frequency is less than one Hz.

24. The device as claimed in claim 22, wherein the frequency of the alternating force is less than 15 Hz.

25. The device as claimed in claim 24, wherein the frequency of the alternating force is 5–6 Hz.

\* \* \* \* \*